(12) United States Patent
Theverapperuma et al.

(10) Patent No.: US 11,375,041 B2
(45) Date of Patent: Jun. 28, 2022

(54) AUTONOMOUS VEHICLE AD-HOC NETWORKING AND DATA PROCESSING

(71) Applicant: SafeAI, Inc., Milpitas, CA (US)

(72) Inventors: Lalin Theverapperuma, Santa Clara, CA (US); Bibhrajit Halder, Sunnyvale, CA (US)

(73) Assignee: SafeAI, Inc., Milpitas, CA (US)

( * ) Notice: Subject to any disclaimer, the term of this patent is extended or adjusted under 35 U.S.C. 154(b) by 374 days.

(21) Appl. No.: 16/388,871

(22) Filed: Apr. 19, 2019

(65) Prior Publication Data

US 2020/0336565 A1 Oct. 22, 2020

(51) Int. Cl.

| | |
|---|---|
| *G06F 15/173* | (2006.01) |
| *H04L 67/61* | (2022.01) |
| *H04L 43/0817* | (2022.01) |
| *H04W 28/24* | (2009.01) |
| *H04L 43/10* | (2022.01) |
| *H04W 28/02* | (2009.01) |
| *H04W 84/20* | (2009.01) |
| *H04W 80/12* | (2009.01) |
| *H04L 67/12* | (2022.01) |
| *H04W 4/40* | (2018.01) |

(52) U.S. Cl.
CPC ........ *H04L 67/322* (2013.01); *H04L 43/0817* (2013.01); *H04L 43/10* (2013.01); *H04L 67/12* (2013.01); *H04W 4/40* (2018.02); *H04W 28/0268* (2013.01); *H04W 28/24* (2013.01); *H04W 80/12* (2013.01); *H04W 84/20* (2013.01)

(58) Field of Classification Search
CPC . H04L 41/16; H04L 43/0817; H04L 43/0829; H04L 43/0852; H04L 43/0888; H04L 43/10; H04L 45/302; H04L 45/3065; H04L 47/24; H04L 67/12; H04L 67/322; H04W 28/0268; H04W 28/24; H04W 40/24; H04W 4/02; H04W 4/40; H04W 4/44; H04W 4/46; H04W 4/80; H04W 80/12; H04W 84/12; H04W 84/18; H04W 84/20
See application file for complete search history.

(56) References Cited

U.S. PATENT DOCUMENTS

2011/0078296 A1* 3/2011 Kamenetsky ......... G06F 15/173 709/223
2019/0339688 A1* 11/2019 Celia ................ G05B 19/41865

* cited by examiner

*Primary Examiner* — Normin Abedin
(74) *Attorney, Agent, or Firm* — Kilpatrick Townsend & Stockton LLP

(57) ABSTRACT

In one aspect, In one aspect, a method for data transfer and processing communications is provided. The method includes the step of providing a machine-to-everything (M2X) application layer on each machine of the plurality of machines. The method includes the step of providing a plurality of communication nodes on each machine for communication between the plurality of machines with every other machine, the plurality of machines and any infrastructure at a work site, and a plurality of communication nodes communicating using the at least one application layer. The method includes the step of providing a communication processing system for receiving a data transfer and processing communications. The communication processing system includes a plurality of processing stations, one or more multiple data management protocols, a plurality of network protocols, a plurality of databases and plurality of data processing network architectures.

19 Claims, 7 Drawing Sheets

PROVIDE A MACHINE-TO-EVERYTHING (M2X) APPLICATION LAYER ON EACH MACHINE OF THE PLURALITY OF MACHINES
502

PROVIDE A PLURALITY OF COMMUNICATION NODES ON EACH MACHINE FOR COMMUNICATION BETWEEN: THE PLURALITY OF MACHINES WITH EVERY OTHER MACHINE; THE PLURALITY OF MACHINES AND ANY INFRASTRUCTURE AT A WORK SITE, AND A PLURALITY OF COMMUNICATION NODES COMMUNICATING USING THE AT LEAST ONE APPLICATION LAYER
504

PROVIDE A COMMUNICATION PROCESSING SYSTEM FOR RECEIVING A DATA TRANSFER AND PROCESSING COMMUNICATIONS
506

DETERMINE A QUALITY OF SERVICE (QOS) PRIORITY FOR EACH PACKET OF THE DATA TRANSFER FROM EACH MACHINE OF THE PLURALITY OF MACHINES
508

SPLIT EACH PACKET OF THE DATA TRANSFER BETWEEN THE MULTIPLE DATA PROCESSING NETWORK ARCHITECTURES BASED ON THE QOS PRIORITY OF EACH PACKET OF DATA
510

FIGURE 5

AUTONOMOUS VEHICLE AD-HOC NETWORKING AND DATA PROCESSING

FIELD OF THE INVENTION

The invention is in the field of autonomous vehicles and more specifically to a method, system and apparatus for autonomous vehicle ad-hoc networking and data transfer and processing communications.

DESCRIPTION OF THE RELATED ART

In the domain of autonomous vehicles, there may be data transfer and processing communications issues at work sites. Additionally, there can be problems in the bursty nature of such autonomous vehicle communications, such as autonomous trucks or heavy vehicles used in a mining or construction site. This can be due to the construction or mine's various physical locations, such as .a remote location, inaccessibility to infrastructure, impossibility of any infrastructure, non-line of sight, and/or material affecting transmissions etc. Additionally, abrupt loss of Wi-Fi network signals and/or loss of connections to network nodes can occur. Accordingly, improvements to the current art that provide for the high data needs of autonomous vehicles while maintaining the reliability of data networks, given the unreliable nature of networks at such remote, construction, or mining sites, are needed.

SUMMARY OF THE INVENTION

In one aspect, a method for data transfer and processing communications is provided. The method includes the step of providing a machine-to-everything (M2X) application layer on each machine of the plurality of machines. The method includes the step of providing a plurality of communication nodes on each machine for communication between the plurality of machines with every other machine, the plurality of machines and any infrastructure at a work site, and a plurality of communication nodes communicating using the at least one application layer. The method includes the step of providing a communication processing system for receiving a data transfer and processing communications. The method includes the step of determining a Quality of Service (QoS) priority for each packet of the data transfer from each machine of the plurality of machines. The method includes the step of splitting each packet of the data transfer between the multiple data processing network architectures based on the QoS priority of each packet of data. The QoS priority is determined based on a combination of the following: a set-up time, a data transfer rate, a transmission range, a volume of the data, a bandwidth variable, a real-time decision support or a processing delay on a data processing network using the data processing network architectures.

BRIEF DESCRIPTION OF THE DRAWINGS

The present application can be best understood by reference to the following description taken in conjunction with the accompanying figures, in which like parts may be referred to by like numerals.

FIG. 5 illustrates an example process for data transfer and processing communications, according to some embodiments.

Figure 1:
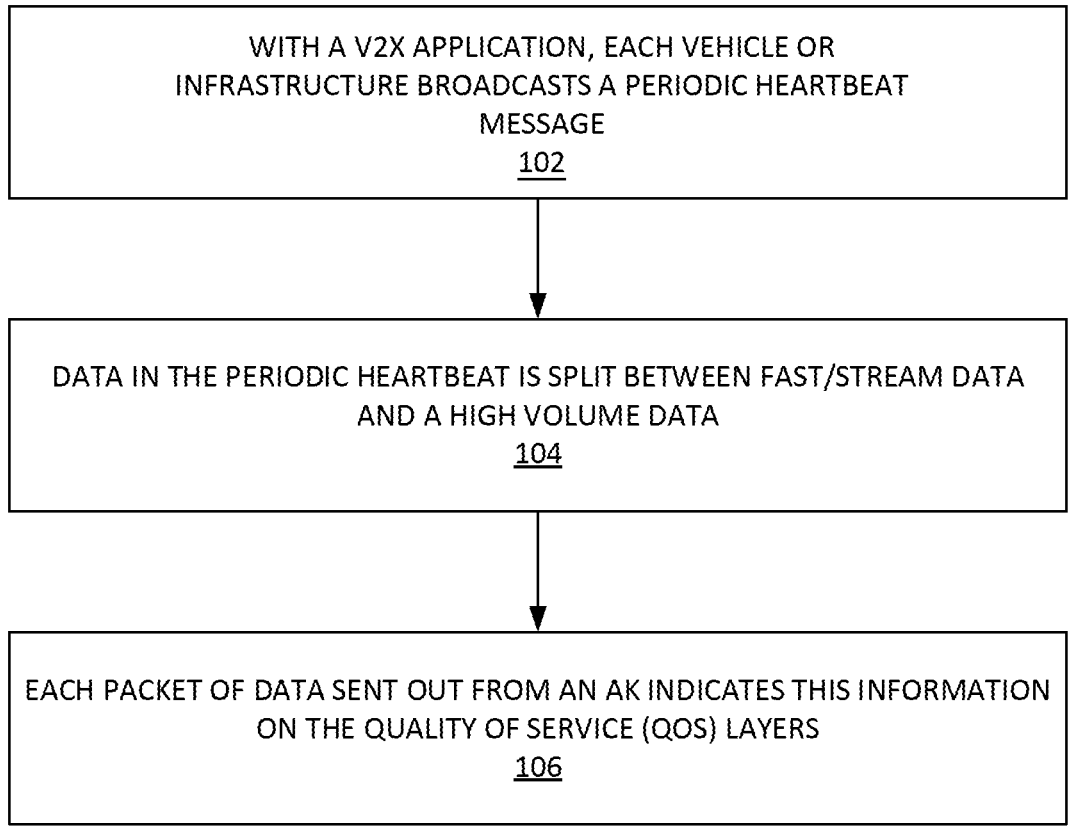
FIG. 1 depicts an example autonomous vehicle management system, according to some embodiments.

The Figures described above are a representative set and are not an exhaustive with respect to embodying the invention.

DESCRIPTION

Disclosed are a system, method, and article of manufacture for autonomous vehicle ad-hoc networking and data processing. Although the present embodiments have been described with reference to specific example embodiments, it will be evident that various modifications and changes may be made to these embodiments without departing from the broader spirit and scope of the particular example embodiment.

References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Definitions

IEEE 802.11 is part of the IEEE 802 set of Local Area Network (LAN) protocols, and specifies the set of media access control (MAC) and physical layer (PHY) protocols for implementing wireless local area network (WLAN) computer communication in various frequencies, including but not limited to: 2.4, 5, 5.9, and 60 GHz frequency bands.

Apache CASSANDRA® is a free and open-source, distributed, wide column store, NoSQL database management system designed to handle large amounts of data across many commodity servers, providing high availability with no single point of failure. CASSANDRA offers robust support for clusters spanning multiple datacenters, with asynchronous masterless replication allowing low latency operations for all clients. It is noted that other NoSQL database management systems can be used in some embodiments other than CASSANDRA.

Artificial intelligence (AI) comprises and/or involves any computing system/device/algorithm that perceives its environment and takes actions that maximize its chance of successfully achieving its goals.

Autonomous vehicle can be a vehicle that is capable of sensing its environment and navigating with or without human input.

Bigdata can refer to data sets that are too large or complex for traditional data-processing application software to adequately deal with. In one context, big-data refers to large volumes of data generated by the sensors, mostly perception, control and planning bases sensors. Data can be generated from the precision mining related sensors. All these data take the form of images, point clouds, kinematics and dynamic data, mapping data, localizing data, and precision mining data. Big-data can utilize low QoS rated data.

Burstiness is the intermittent increases and decreases of signal strength or packet transmission capacity due to physical layer properties. This can be derived from burst error, where many consecutive packets become lost during a transmission due to interference or some undesired channel conditions or events.

Convolutional neural network (CNN) is a class of deep neural networks. CNNs use a variation of multilayer perceptrons designed to use minimal preprocessing, reuse of convolutional kernels/filters to reduce the processing complexity. CNNs are learning abilities could be on the kernels and fully connected or sigmod (output) layers.

Dedicated short-range communications are one-way or two-way short-range to medium-range wireless communication channels specifically designed for automotive use and a corresponding set of protocols and standards.

Deep neural network (DNN) is an artificial neural network (ANN) with multiple layers between the input and output layers. DNNs could be viewed as function approximators between an input and output, whether it be a linear relationship or a non-linear relationship. DNN networks are learned with prior data and interference at the usage time. The computations on a DNN network progress through the layers calculating the probability of each layers output.

Heartbeat can be a periodic signal used to indicate an operational state and/or to synchronize parts of a system.

Lidar (LIDAR) is a surveying method that measures distance to a target by illuminating the target with pulsed laser light and measuring the reflected pulses with a sensor.

Long short-term memory (LSTM) units are units of a recurrent neural network (RNN). LSTM is a stabilized version of recurrent neural network with gates and connections with stabilizations which learned. This is another type of DNNs.

Machine learning (ML) is a field that deals with the study of algorithms and statistical models that computer systems use to progressively improve their performance on a specific task. Machine learning algorithms build a mathematical model of sample data/training data, to make predictions and/or decisions without being explicitly programmed to perform the task.

Map matching can match recorded geographic coordinates to a logical model of the real world, (e.g. using a Geographic Information System (GPS), etc.). In one example, a map matching algorithm can obtain a recorded, serial location points (e.g. from GPS) and relate them to edges in an existing street graph (e.g. as a network). This can be in a sorted list representing the travel of an autonomous vehicle.

Quality of service (QoS) is the description or measurement of the overall performance of a service, such as a telephony or computer network or a cloud computing service, particularly the performance seen by the users of the network. To quantitatively measure QoS, several related aspects of the network service can be considered, such as, inter alia: packet loss, bit rate, throughput, transmission delay, availability, jitter, etc.

Radar is an object-detection system that uses radio waves to determine the velocity of objects.

TensorFlow is an open-source software library for dataflow programming across a range of tasks. It is a symbolic math library and is also used for machine learning applications such as neural networks.

Vehicle-to-everything (V2X) communication is the passing of information from a vehicle to any entity that may affect the vehicle, and vice versa. It is a vehicular communication system that incorporates other more specific types of communication as V2I (Vehicle-to-Infrastructure), V2V (Vehicle-to-vehicle), V2P (Vehicle-to-Pedestrian), V2D (Vehicle-to-device) and V2G (Vehicle-to-grid).

V2V (vehicle-to-vehicle) is an automobile technology designed to allow automobiles to communicate to each other. In some examples, V2V systems can use a region of the 5.9 GHz band.

Vehicular ad-hoc networks (VANETs) are created by applying the principles of mobile ad hoc networks (MANETs)—to the spontaneous creation of a wireless network for V2V data exchange—to the domain of vehicles. VANETs use moving vehicles as nodes in a network to create a mobile network. It is noted that waypoint-based mobility and/or estimated waypoint-based mobility of vehicular nodes can be taken into account when VANETs are created.

Vehicle can be a mobile machine (e.g. transports people or cargo). Typical vehicles can include wagons, bicycles, motor vehicles (e.g. motorcycles, cars, trucks, buses), railed vehicles (e.g. trains, trams), watercraft (e.g. ships, boats), aircraft, spacecraft and/or heavy equipment (e.g. dump trucks, tractors, etc.), other mining and construction equipment, etc.

Voxel can be a three-dimensional analogue of a pixel.

Exemplary Systems

A multi-model ad-hoc network system is provided. The multi-model ad-hoc network system can be a hybrid system that includes multiple nodes and processing stations (e.g. a remotely placed central processing system, etc.). The multi-model ad-hoc network system can support a myriad of sensors, data processing nodes and various types of communications protocols and modes of setting up networks (e.g. ad-hoc and planned). Accordingly, the multi-model ad-hoc network system can be a duplicated redundant system that provides redundancy, throughput, and robustness to any site (e.g. mining or construction sites etc.). The multi-model ad-hoc network system can include various data communication infrastructure such as those provided infra. A benefit of an ad-hoc network system is the ease of deploying such a network in areas where infrastructure either does not exist or is inaccessible due to the location of a site, for example, a construction site or a remote mineral mine etc. Furthermore, such a system allows to account for an environment that changes dynamically.

In one example, the multi-model ad-hoc network system can be an IEEE 802.11p based network with a vehicle-to-vehicle (V2V) and a vehicle-to-infrastructure (V2I) layer above it. The multi-model ad-hoc network system can operate on an Intelligent Transportation Systems (ITS) band of 5.9 GHz.

The multi-model ad-hoc network system can include regular high bandwidth links supported by IEEE 802.11ab 2.4 GHz and/or IEEE 802.11ac 5 GHz. These can be used for large data transfers. It is noted that both systems can coexist at the 5 GHz range. The architecture of the multi-model ad-hoc network system can combine both network systems into a unified architecture for high speed and high bandwidth data transfers. It is noted that in some embodiments, when an LTE network is robustly available, the multi-model ad-hoc network system can use a cellular/LTE network instead of a V2V (and/or V2X) network.

The multi-model ad-hoc network system can include a distributed network setup with ad-hoc nodes and a V2V and V2I routing approach. In this way, the multi-model ad-hoc network system can enable communications from central stations to a remote machine (e.g. vehicle hereafter referred to as machine) via infrastructure and/or other machines when the network is bursty. Each machine (e.g. autonomous machines, etc.) can act as an endpoint, as well as, a mini router in the network to provide significant robustness. The multi-model ad-hoc network system can be integrated with the various systems and processes provided infra in various embodiments.

Example Systems and Methods

FIG. 1 depicts an example autonomous vehicle management/control system, according to some embodiments. Process 100 can use a V2X application to manage the autonomous vehicle management system. Accordingly, in step 102, process 100 can provide an additional feature on top of the V2X application where each vehicle broadcasts a periodic heartbeat message. Process 100 provides redundant transponders per each endpoint of the vehicle management system to increase the network reliability. The heartbeat message includes a GPS position, system's time, status and mission critical information bytes.

Figure 2:
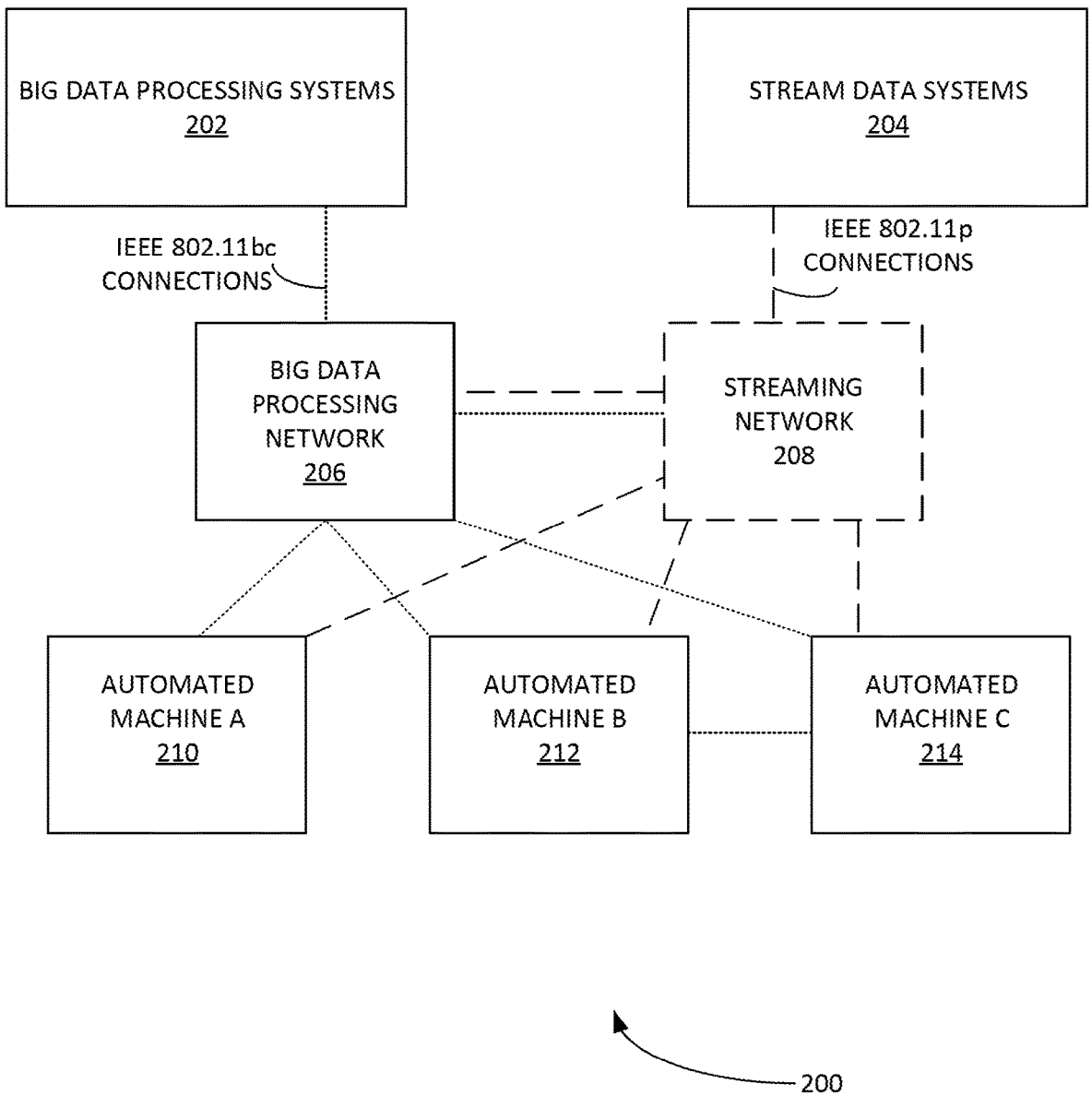
FIG. 2 illustrates an example system implementing data processing and communications between multiple machines, according to some embodiments.

In step 104, the data in the periodic heartbeat is split between stream data (e.g. fast-stream data) and a high-volume data (e.g. the slow/big-data of FIG. 2 infra). In step 106, each packet of data sent out from an AK indicates this information on the Quality of Service (QoS) layers. It is noted that QoS can include the speed needs, as well as, mission critical aspect of the data packet. For example, real time position data recorded from the machine ten (10) minutes in the past which was not sent for a specific reason can be of a very low priority, and may not be sent to a stream processor. Accordingly, only the summaries of this information is then sent to a big-data processing system (e.g. big-data processing systems 202, etc.). It is noted that QOS is one of the criteria that can be used to split the periodic heartbeat. Other criteria can include, for example: the data-packet size and data-packet origin. These criteria can govern the destination as well as the network to use. For example, CNN training data is being communicated from an autonomous machine's camera/LiDAR to a central big data storage, the slower-big bandwidth network can be used. QOS settings are also utilized when a network is bursty and decisions are made on which data is to be transferred.

FIG. 2 illustrates an example system 200 implementing data processing and communications between multiple machines, according to some embodiments. System 200 comprises a dataflow and data processing architecture. System 200 further comprises big-data processing system(s) 202 (e.g. low QoS rated data) and streaming processing system 204 (e.g. high QoS rated data). Accordingly, system 200 depicts two types of superimposed networks. System 200 can be used for determining autonomous machine position, instantaneous data communications, etc. System 200 can include networks that are generated via an ad-hoc manner.

Big-data processing system(s) 202 can process slow/big data. This can include low QoS rated data. Slow/big-data is captured from specified sensors, image sensors, LiDAR systems, RADAR systems, accelerometers, gyroscopes, torque sensors, position sensors, relative displacement/force sensors, inductive sensors and chemical, geological sensors (mining) etc. and the data is processed for future model refinement, as well as, more long-term strategic/statistical data analysis. Big-data processing system(s) 202 can also include a NoSQL database management system designed to handle large amounts of data across various commodity servers (e.g. Apache CASSANDRA, etc.). This data also consist of comprehensive spatio-temporal database representing the actual physical structure of the mine, terrain, geology, resources, pit layout, road structure. In the case of construction sites, the data can include buildings, changing landscape of assets, debris, etc.

Streaming processing system 204 can manage streaming data and/or portions of the real-time sensor data (e.g. digital images, LIDAR, RADAR data, position, kinematic and dynamic data). This can include data that is generated in streams of continuously generated data. This can also include various low QoS data. Example streaming data can also include, inter alia: real-time image data from the cameras and vehicle data, etc.

The streaming data can be processed via a stream processor (e.g. an Apache® KAFKA stream processor, etc.). AI/ML/DNN modules can be used for big-data processing system(s) 202 and stream processing system(s) 204.

Summaries can be generated from brokers (e.g. KAFKA brokers, et.) and sent to a long-term processing system. DNN/CNN models can be used in the autonomous machines and be updated with inputs from the streaming data. Real-time analytics of the operations can be generated via stream-data system 204.

Streaming network 208 can be based on a Dedicated Short-Range Communication (e.g. IEEE 802.11p) implemented through onboard devices suitable for Vehicular Ad hoc Networks (VANETs). The streaming data sent through network 208 can be buffered and replicated. A master node can be appointed on the basis of the existing communications and current conditions.

Big-data network 206 can be an IEEE 802.11bc based network. Big-data network 206 can be overlapped and/or uses the same network infrastructure as streaming network 208. Big-data network 206 can transfer high-volume slower data, CNNs, LSTMs and/or other learned modules that the system uses in large volumes of high-fidelity data for training purposes. This data can serve as training models deployed on the autonomous machine. Another area of slow-data usage can be when the throughput of data generated by the sensor is too large and the system transmits the outliers and high information data segments (e.g. with the low QoS rated data to be sent over the fast network). The remaining bulk of the data (e.g. with a low QoS rating) is passed via the to the slower large database/processing system. Example decisions to select the high speed or slow networks can be based on such factors as, inter alia: connection set-up time, data transfer rate, transmission range, processing delays on the network and/or QoS priority of the data packets, etc.

Figure 3A:
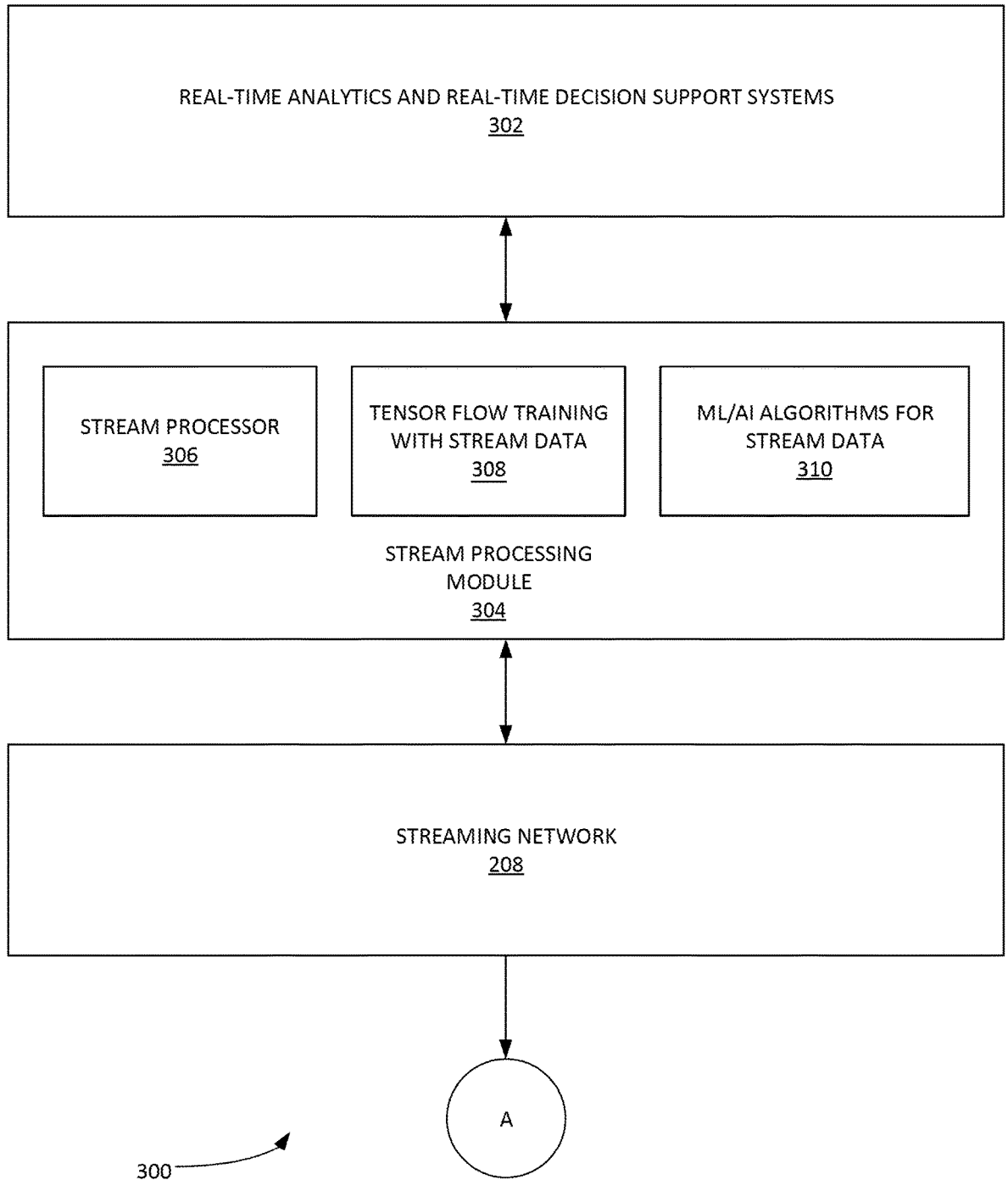
FIGS. 3A-C depicts example data processing and storing architecture for implementing the various processes and systems herein, according to some embodiments.
Figure 3B:
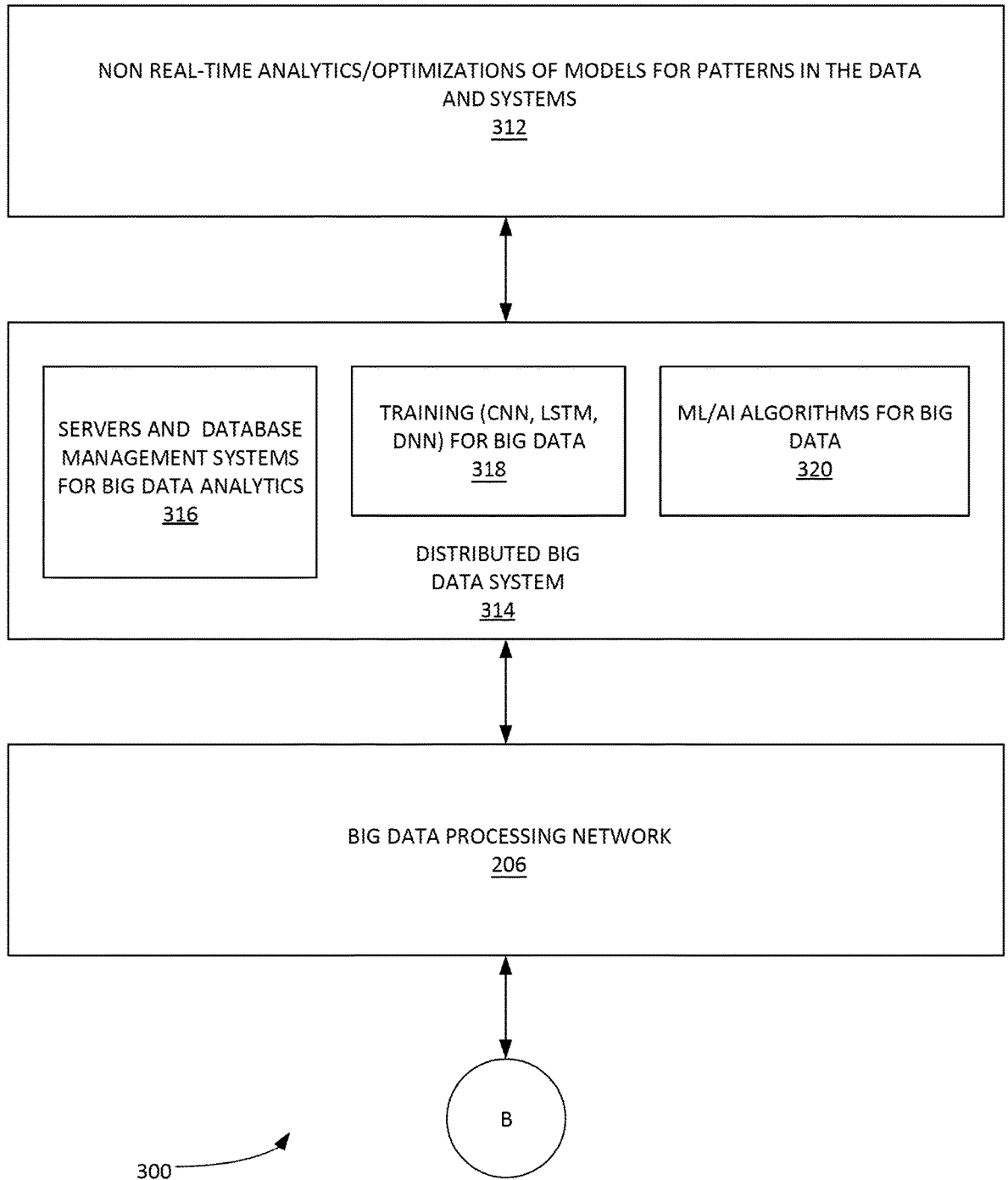
Figure 3C:
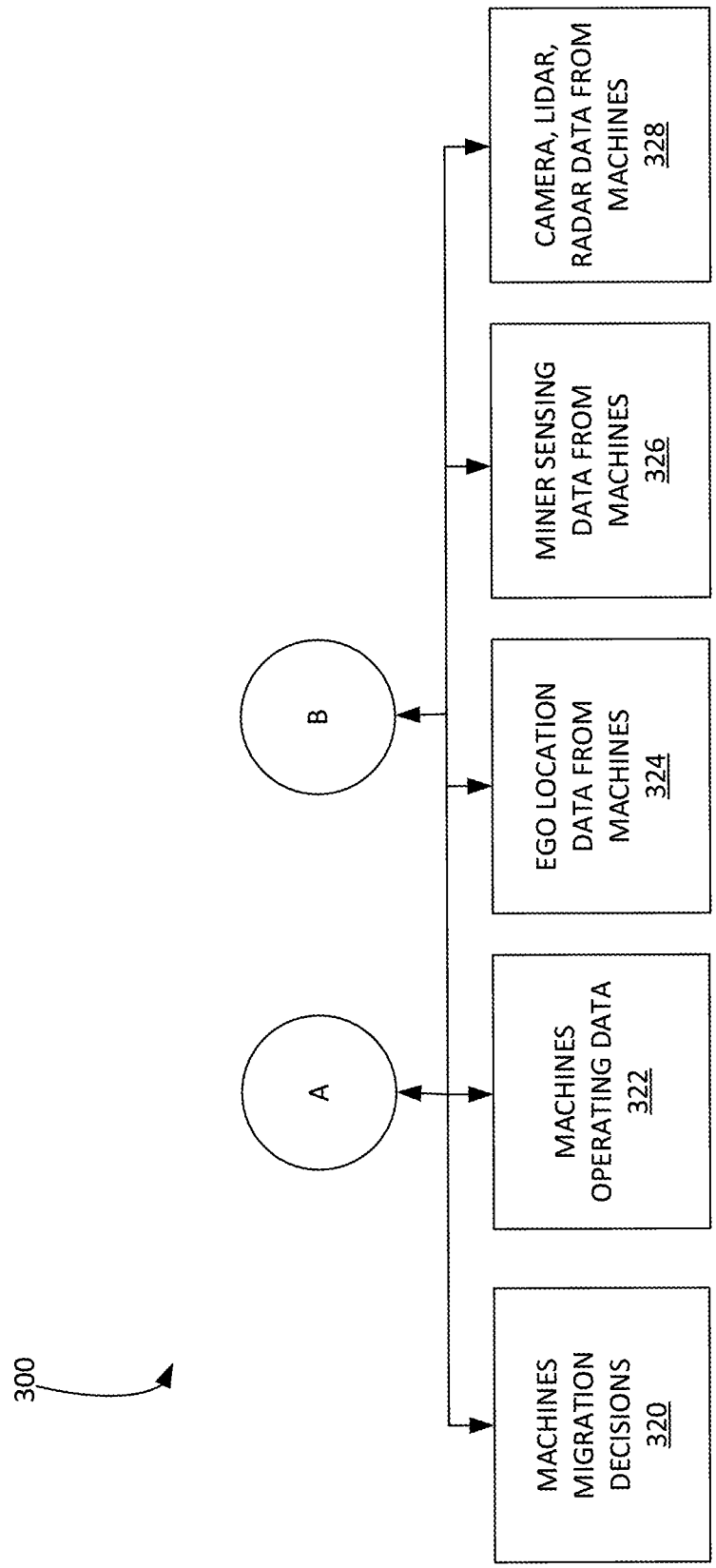

FIGS. 3A-C depicts example data processing and storing architecture 300 for implementing the various processes and systems herein, according to some embodiments. The data from the sensors can be sent to a fast network (e.g. streaming network 208) or a slow network (e.g. big-data network 206) depending on various QoS parameters.

Architecture 300 can include a stream processing aspect as provided in FIG. 3A. Real-time analytics and real-time decision support systems 302 can provide real-time analytics and real-time decision support. Examples of real-time analytics can include, inter alia: the amount of material which is moved, environmental and geological analytics and vehicle status information (such as fuel level and other vehicle parameters). Real-time decisions can include, inter alia: the speed of vehicle, vehicle position, vehicle pose and/or other information used for time-critical decision making by the respective machine, as well as, other relevant machines. It is noted that as used herein 'real time' assumes various computer and networking processing latencies.

Stream processing module 304 can include stream processor designed to perform, inter alia: the high-speed processing of the streams of data originated from the sensors 306, TensorFlow training (and/or other symbolic math and computational data flow graph building libraries used for machine learning applications, etc.) with stream data 308, training of the stream ML/AI/CNN models on the computational graph-based hardware and/or accompanying software and ML/AI algorithms for stream data 310. Algorithms specifically designed to learn, adapt, and update based on the input stream some of these can use online learning techniques (as opposed to batch-based learning models which can be used in the big-data training systems). Real-time analytics and real-time decision support systems 302 can be coupled with streaming network 208. In this way, real-time analytics and real-time decision support systems 302 and stream processing module 304 can be communicatively coupled with machine systems 320-328 of FIG. 3C.

Architecture 300 can include a distributed big-data processing aspect as provided in FIG. 3B. Distributed big-data processing can include, inter alia: non-real-time analytics optimizations for patterns in the data and systems module 312. Large volumes of data can be made into batches and/or mini batches. These can be summarized and/or used in batch form for non-real-time optimizations. Non-real-time decisions can also include the general geological surveys for non-real-time decisions. Non-real-time decisions can include the decision support systems where changes to mine's map or construction sites map can't be updated via the non-real-time analytics optimizations for patterns in the data and systems module 312. The non-real-time analytics optimizations for patterns in the data and systems module 312 can implement non-real-time analytics optimizations. A distributed big-data system is provided for the large volumes of data and/or partitioning of data into shards and/or mini batches. Additionally, big-data system 314 can include, inter alia: servers and database management systems for big-data analytics. A sharded NoSQL systems with big tables and key value store databases can be used for distributed analytics 316, training module for big-data 318 (e.g. uses CNN, LSTM, DNN, etc.), ML/AI algorithms for big-data 320, etc. Distributed big-data system 314 can be coupled with big-data processing network, big-data processing systems such as Apache Spark® frameworks can be attached to the above databases 206. In this way, non-real-time analytics optimizations for patterns in the data and systems module 312 and distributed big-data system 314 can be communicatively coupled with machine systems 320-328 of FIG. 3C.

Machine systems 320-328 of FIG. 3C can include, inter alia: machines migration decisions 320, machines operating data 322, ego location data from machines 324, etc. in the GPS denied and/or in poor GPS environments, as well as, times when precise location is utilized. For example, this can be in cases of spotting where the pose and exact location of the machine is used for the ego location of machine(s) and/or when a mine's mineralogical and geological sensing data from said machines is processed using the distributed big-data system.

The high-QoS rated data can be determined based on a set-up time, a data transfer rate, a transmission range, processing delays and a QoS priority of a set of data packets. The low-QoS rated data can include a high-fidelity data for use as training data for one or more models deployed on the machine.

Example Use Cases and Applications

In one example, a precision mining array of sensors are installed on a mining machine. The precision mining array of sensors collects real-time ore and other mining information. This real-time ore/mining data is then used in understanding a mine's geological plans, material properties, etc. The real-time ore/mining information is time/geolocation tagged and moved to a central database for further processing. The real-time ore/mining information is important in the time scale of hours, so it is QoS stamped with a one (1) hour stamp and provided to a network layer.

The network layer then communicates the real-time ore/mining information via a slow high bandwidth network (e.g. big-data processing network 206). This high-bandwidth network may not have coverage at all areas of the mine and can queue the real-time ore/mining information. Accordingly, when bandwidth is available the real-time ore/mining information can be sent to the central processing system (e.g. distributed big-data system 314, etc.).

In another example, when a Global Positioning System (GPS) is not available and an autonomous machine is set to arrive at a specific location. The autonomous machines can use its camera/LiDAR and/or radar sensor information for navigation and location determination. For example, current pose information and expected pose information of the machine on a given area are sent via a low bandwidth high-speed network (e.g. streaming network 208). The camera/LiDAR and radar sensor information is QoS stamped with high priority and high-speed stamp. The camera/LiDAR and radar sensor information is then sent via an ad-hoc layer and also sent via a slow network to improve the reliability as well. The ad-hoc layer is generated by the VANET. In the VANET, many of the nodes are moving on some preset or estimated waypoints. When a message is to be sent to a device outside the transmission range, it enlists nearest possible host, which it finds using the GPS information and distributed routing table of geographic-based reactive routing protocol. This is performed to ensure the route from the source the destination is found. When the camera/LiDAR and radar sensor information reaches the intended nodes (e.g. the network address of the node) the respective data packet(s) can be delivered. In one example, the camera/lidar and radar sensor information is maintained at a Kafka (or similar) server system. Management of the network traffic can be implemented through the application which is responsible for localizing on no GPS areas.

In another example, updates to the ego-space of a machine is implemented via fast and slow networks. An autonomous mining machine collects imaginary and LiDAR point-cloud data to determine and maintain knowledge about the position and environment of the autonomous mining machine. Ego-space can be represented as a voxelized volumetric representation. This representation can then be used to implement a safe and accurate autonomous driving of the autonomous mining machine on a specified terrain. This representation can be updated with changes to the mine, as well as, any changes to a road network. The ego-space update includes use of, inter alia: any preexisting map information, current image/LiDAR, sensor-fused information, etc. The ego space can include periodic and/or ad hoc updates of current data from autonomous mining machine(s). Simultaneously, this information can also be used navigate in GPS-denied environments. Example mining machines can include, inter alia: bulldozers, excavators, loaders, haul trucks, hauling units, skid steers, backhoe loaders, etc.

In yet another example, a Deep Convolutional Neural Network (DCNN) model update is implemented using a slow big-data network (e.g. big-data network 206, etc.). The image and LiDAR data from an autonomous machine can be used for object detection and identification. The image and LiDAR data from an autonomous machine can also be used for segmenting a scene and understanding/identifying the objects in the scene. Portions of scene understanding can be used for ego-space safety and navigation. Portions of scene understanding can be used for task planning for the autonomous machine(s). The image and LiDAR data generated from the autonomous machine can be large and bulky due to the nature of the data. For example, the data can be a hundred times (×100) to ten-thousand times (×10000) large than the pose or localization data. This information is used to update the DCNN model and can be moved to a database (e.g. a CASSANDRA database, etc.). The information can then be used to model relevant training systems. This data sent with a low QoS priority and moved to a remotely placed central processing system (e.g. see FIG. 3B) in the time scale of hours to days. An example model update is not time sensitive for the proper operation of the machine in this example.

Additional Exemplary Environment and Architecture

Figure 4:
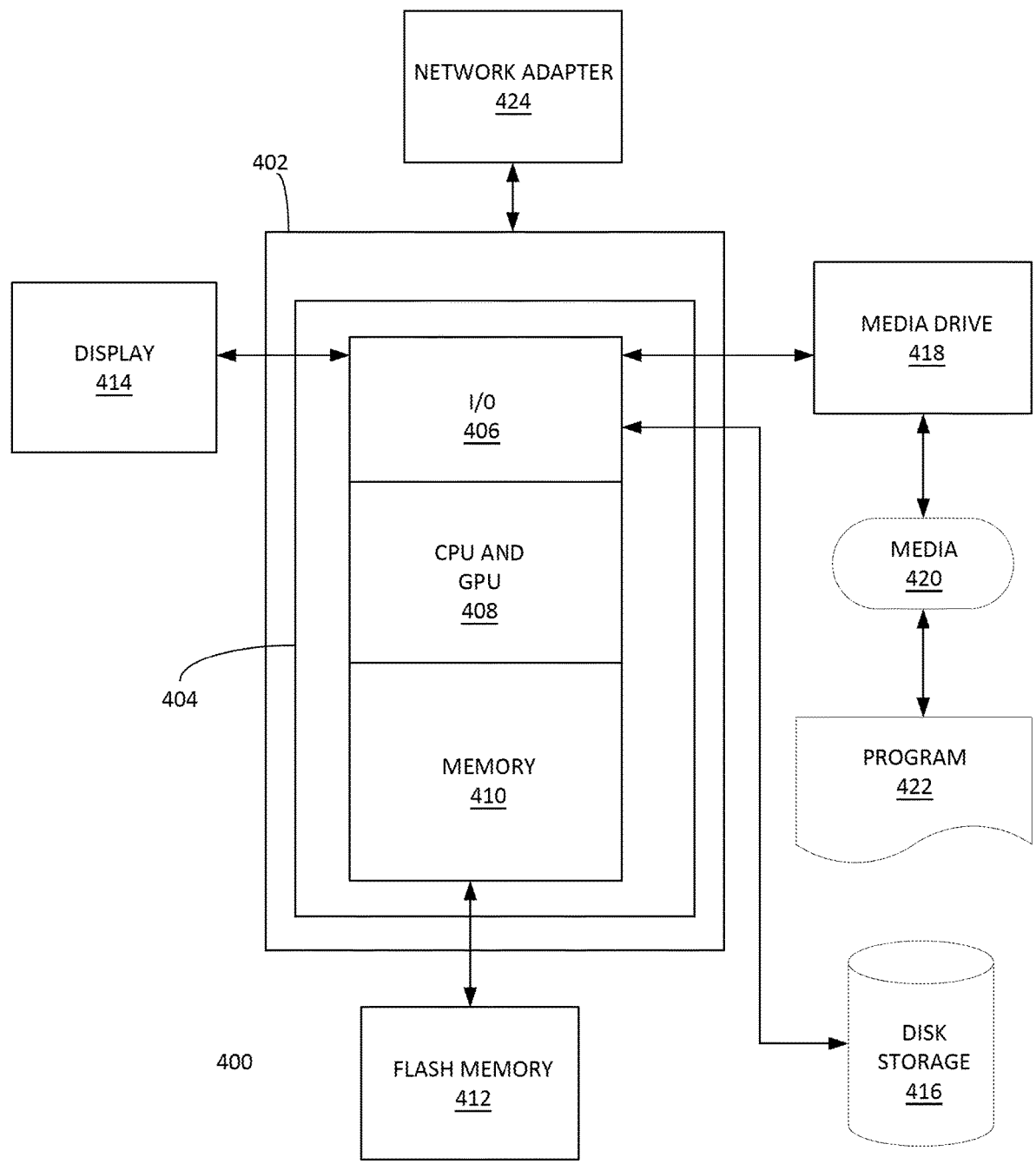
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) and/or graphics processing unit (GPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc. Network adapter 324 can be a computer hardware component that connects a computer to a computer network.

System 400 can be used to implement various vehicular communication systems (VCS). A VCS can be a network in which vehicles and roadside units are the communicating nodes, providing each other with information, such as safety warnings and traffic information. They can be effective in avoiding accidents and traffic congestion. Both types of nodes can be dedicated short-range communications (DSRC) devices. DSRC works in five-point-nine gigahertz (5.9 GHz) band with bandwidth of seventy-five megahertz (75 MHz) and approximate range of three-hundred meters (300 m). Vehicular communications can be a part of an intelligent transportation system (ITS).

Additional Processes

FIG. 5 illustrates an example process 500 for data transfer and processing communications, according to some embodiments. In step 502, process 500 provides a machine-to-everything (M2X) application layer on each machine of the plurality of machines. In step 504, process 500 provides a plurality of communication nodes on each machine for communication between: the plurality of machines with every other machine; the plurality of machines and any infrastructure at a work site, and a plurality of communication nodes communicating using the at least one application layer. In step 506, process 500, provides a communication processing system for receiving a data transfer and processing communications. The communication processing system includes a plurality of data processing network architectures. In step 508, process 500 determines a Quality of Service (QoS) priority for each packet of the data transfer from each machine of the plurality of machines.

In step 510, process 500 splits each packet of the data transfer between the multiple data processing network architectures based on the QoS priority of each packet of data. The QoS priority is determined based on a combination of the following: a set-up time, a data transfer rate, a transmission range, a volume of the data, a bandwidth variable, a real-time decision support or a processing delay on a data processing network using the data processing network architectures. It is noted that process 500 can provide a link layer that broadcasts a heartbeat message at a set of predetermined intervals to detect the connectivity or position of each machine in the plurality of machines over the data processing network

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (e.g. PHP, MATLAB, XML). It is noted that JavaScript has been used as an example in several embodiments. However, in other embodiments, another scripting language and/or JavaScript variants can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method for data transfer and processing communications, the method comprising:
providing a machine-to-everything (M2X) application layer on each machine of a plurality of machines that operate at a work site, wherein at least some of the plurality of machines are autonomous vehicles;
providing a communication node on each machine using the M2X application layer for communication between:
the machine and every other machine of the plurality of machines; and
the machine and an infrastructure at the work site,
wherein the communication node on each machine supports a plurality of network architectures, the plurality of network architectures including a high-speed network architecture supporting real-time communication and a slow-speed network architecture supporting large data transfers, and wherein the communication node on each machine is operable as both an endpoint for data packets and a router for data packets originating from a different one of the machines in the plurality of machines;
providing a communication processing system for receiving data from the plurality of machines and processing the data, the communication processing system comprising a plurality of data processing systems, wherein different data processing systems communicate with the plurality of machines using different ones of the plurality of network architectures;
generating, by a first machine of the plurality of machines, a data packet;
determining, by the first machine, whether the data packet relates to a real-time task or a non-real-time task;
determining, by the first machine, a Quality of Service (QoS) priority for the data packet, wherein the QoS priority indicates whether to use the high-speed network architecture or the slow-speed network architecture, wherein determining the QoS priority is based at least in part on whether the data packet relates to a real-time task or a non-real-time task; and
sending, by the first machine, the data packet to one or more of the data processing systems via a second machine of the plurality of machines, wherein the second machine routes the data packet via one or more of the network architectures based on the QoS priority of the data packet.

2. The method according to claim 1, wherein the high-speed network architecture uses a Dedicated Short-Range Communication protocol.

3. The method according to claim 1, wherein the slow-speed network architecture uses an IEEE 802.11bc based network protocol.

4. The method according to claim 1,
wherein the data processing system that communicates using the slow-speed network architecture comprises a NoSQL database management system for handling a set of high-fidelity data across a set of commodity servers, and
wherein the high-fidelity data comprises a spatio-temporal database representing a physical structure.

5. The method according to claim 4, wherein the high-fidelity data comprises a set of big data for use as training data, statistical analysis or strategic analysis for one or more models deployed on each machine of the plurality of machines.

6. The method according to claim 1, wherein the data processing system that communicates using the high-speed network architecture comprises a stream processor for handling real-time data related to the plurality of machines.

7. The method according to claim 6, wherein the real-time data comprises a location of a machine of the plurality of machines, a decision of the machine, or a position of the machine.

8. The method according to claim 1, further comprising:
providing, in the communication node of each machine in the plurality of machines, a link layer that broadcasts a heartbeat message over one or more of the network architectures at a set of predetermined intervals to indicate a connectivity status and position of the machine.

9. The method according to claim 8, further comprising:
generating an ad-hoc network between the communication nodes of different machines in the plurality of machines based on the heartbeat message that is received.

10. The method according to claim 9, further comprising:
appointing a temporary master node from among the communication nodes in the ad-hoc network, wherein the temporary master node is set to a specified machine at which streaming data from which the high-speed network architecture is being replicated.

11. The method according to claim 10, further comprising:
broadcasting a routing table to be used to communicate each packet of the data transfer when a position of one or more of the communication nodes changes due to movement of one or more of the machines.

12. The method according to claim 1, further comprising:
communicating one or more data packets via the high-speed network architecture and the slow-speed network architecture regardless of the QoS priority of the one or more data packets; and
discarding any copy of any of the one or more data packets that is second to arrive at one of the data processing systems.

13. The method of claim 1,
wherein the work site comprises a mining site, and
wherein at least one of the machines is an autonomous mining machine.

14. The method of claim 13, wherein a spatio-temporal database comprises a representation of a physical structure of the mining site, a terrain of the mining site, geology of the mining site, a pit layout of the mining site, or a road structure of the mining site.

15. The method according to claim 1, wherein the first machine is a first autonomous vehicle and determining whether the data packet relates to a real-time task or a non-real-time task includes:
   determining that the data packet relates to a real-time task in the event that the data packet relates to a current or expected pose of the first autonomous vehicle or to a speed of the first autonomous vehicle.

16. The method according to claim 1, wherein the first machine is a first autonomous vehicle and determining whether the data packet relates to a real-time task or a non-real-time task includes:
   determining that the data packet relates to a real-time task in the event that the data packet relates to an amount of material that is moved by the first autonomous vehicle.

17. The method according to claim 1, wherein determining whether the data packet relates to a real-time task or a non-real-time task included:
   determining that the data packet relates to a non-real-time task in the event that the data packet relates to ore and mining information obtained by the first machine.

18. The method according to claim 1, wherein determining whether the data packet relates to a real-time task or a non-real-time task included:
   determining that the data packet relates to a non-real-time task in the event that the data packet relates to an update to an ego-space of the first machine.

19. A system comprising:
   a plurality of autonomous vehicles capable of moving material at a work site;
   a first data processing system for real-time data processing; and
   a second data processing system for non-real-time processing of large data sets,
   wherein each of the autonomous vehicles includes:
      a communication interface supporting a plurality of network architectures, the plurality of network architectures including a high-speed network architecture supporting real-time communication and a slow-speed network architecture supporting large data transfers, and wherein the communication interface on each autonomous vehicle is operable as both an endpoint for data packets and a router for data packets originating from a different one of the autonomous vehicles in the plurality of autonomous vehicles; and
      a processor coupled to the communication interface and configured to:
         generate a data packet;
         determine whether the data packet relates to a real-time task or a non-real-time task;
         determine a Quality of Service (QoS) priority for the data packet, wherein the QoS priority indicates whether to use the high-speed network architecture or the slow-speed network architecture, wherein determining the QoS priority is based at least in part on whether the data packet relates to a real-time task or a non-real-time task; and
         send the data packet to one or both of the first data processing system or the second data processing system via a second one of the autonomous vehicles, wherein the second one of the autonomous vehicles routes the data packet via one or more of the network architectures based on the QoS priority of the data packet.

* * * * *